Feb. 2, 1932.  S. S. FURRER  1,843,275
MULTIPLE HITCH FOR MULTIPLE GANG HARROWS
Original Filed Sept. 30, 1929   3 Sheets-Sheet 1
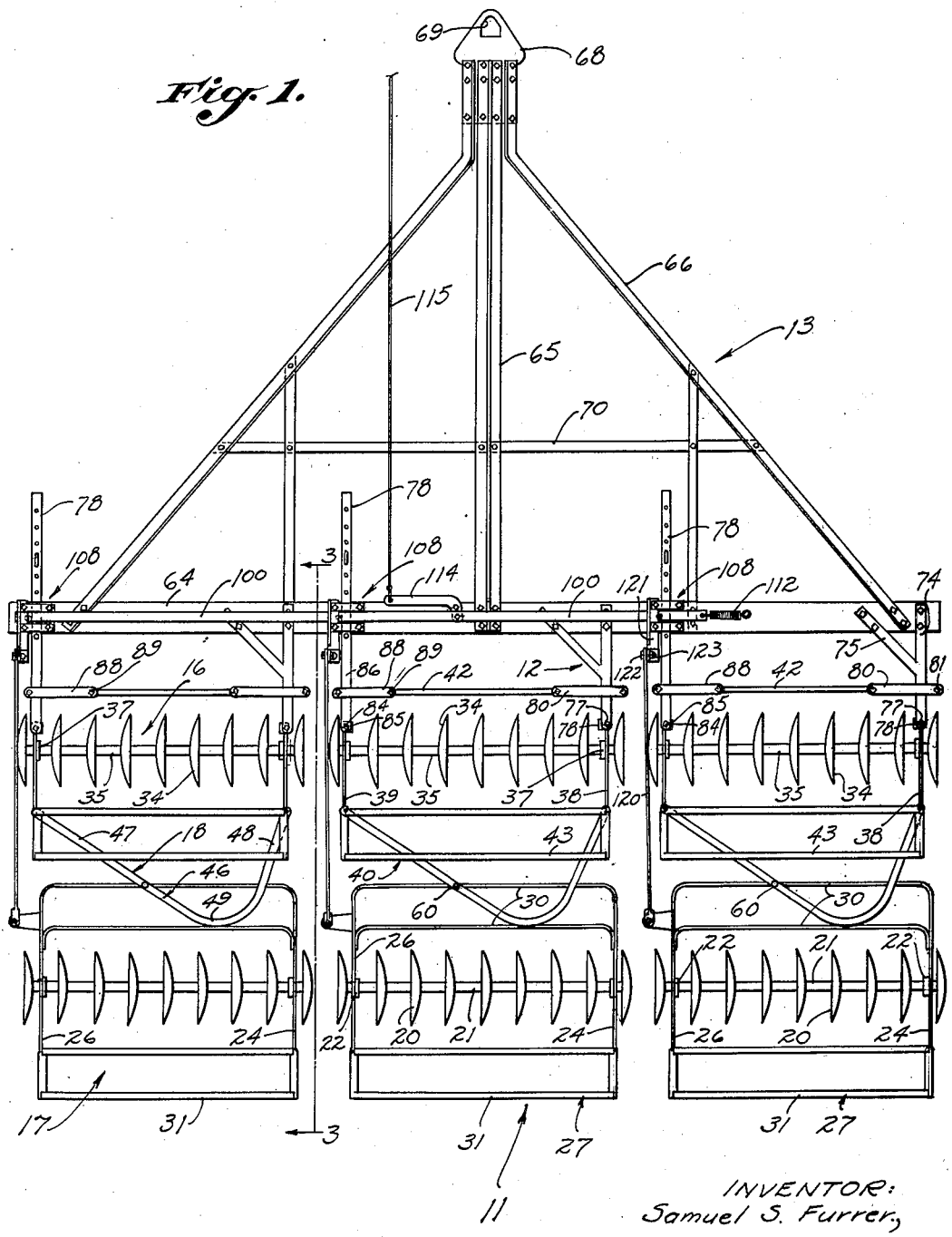
INVENTOR:
Samuel S. Furrer,
BY
ATTORNEY.

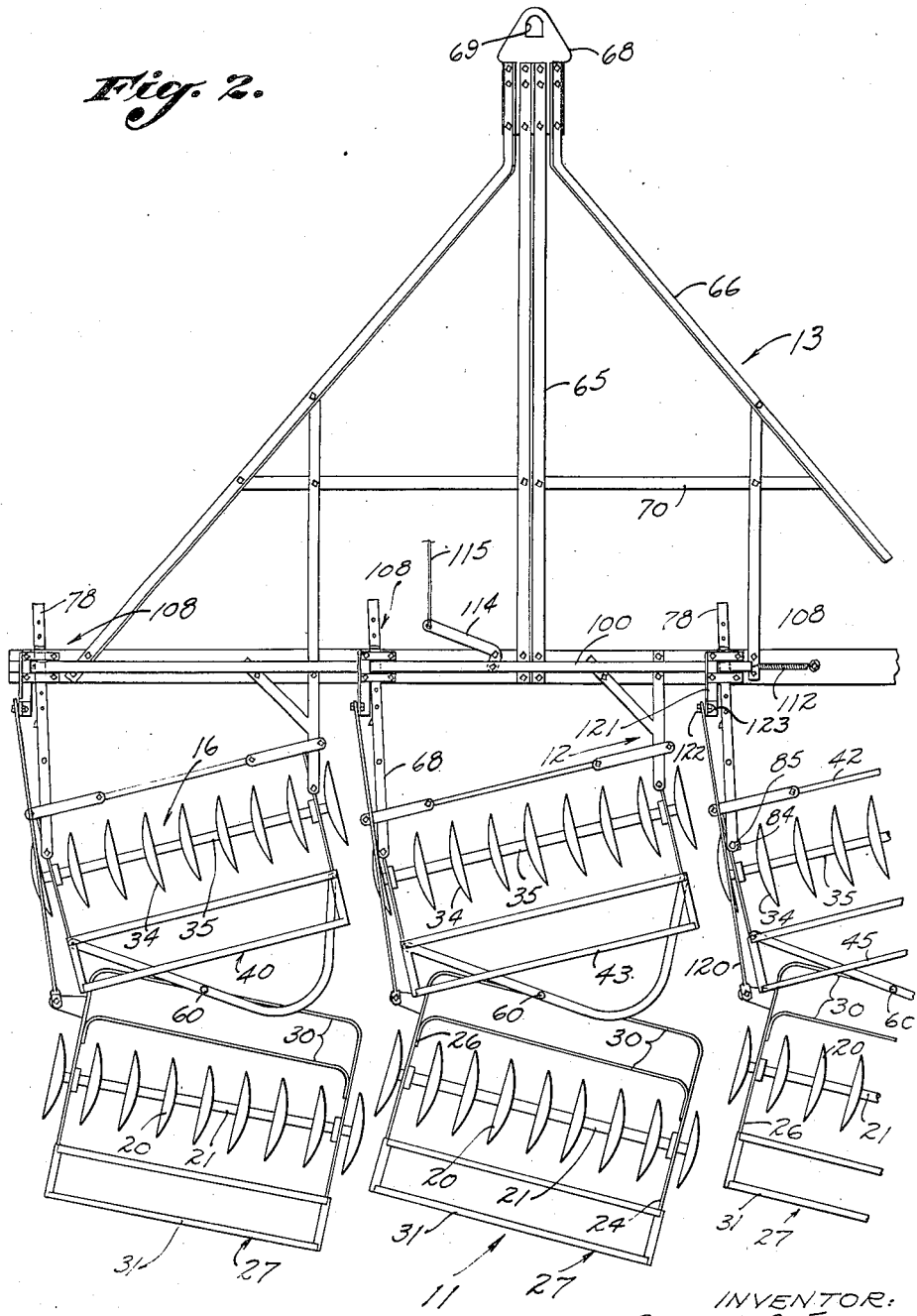

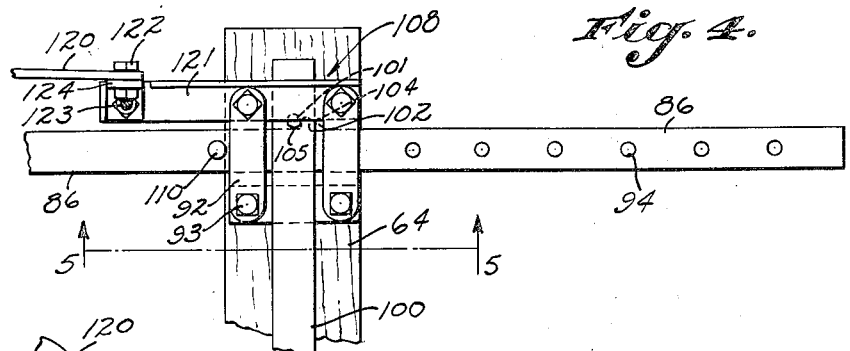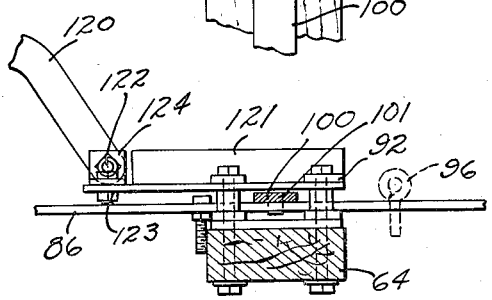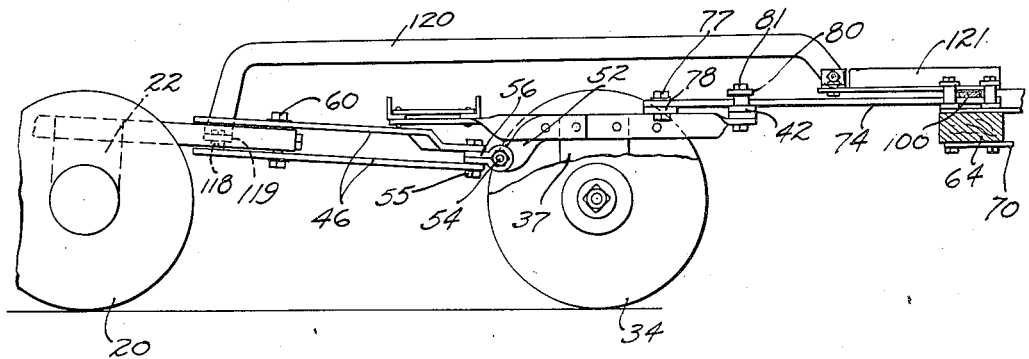

Patented Feb. 2, 1932

1,843,275

UNITED STATES PATENT OFFICE

SAMUEL S. FURRER, OF OXNARD, CALIFORNIA, ASSIGNOR TO BRENNEIS MANUFACTURING COMPANY, OF OXNARD, CALIFORNIA, A CORPORATION OF CALIFORNIA

MULTIPLE HITCH FOR MULTIPLE-GANG HARROWS

Application filed September 30, 1929, Serial No. 396,028. Renewed August 4, 1930.

My invention relates to a multiple hitch for connecting a plurality of multiple-gang disc harrows to a draft yoke.

My invention is particularly adapted to be used with harrows of the type shown in my co-pending applications, entitled "Disc harrow", Serial No. 159,800, filed January 8, 1927, and "Disc harrow", Serial No. 356,832, filed April 20, 1929, in which the harrows are swung to an angled working position by a forward movement thereof and are swung to a non-working position by a backward movement thereof. The present method of connecting two or more similar harrows abreast of one another so as to be drawn by a single tractor or other draft device is to connect the harrows to an evener by chains and connect the evener to the tractor by other chains. This method of connection permits the harrows to interfere with one another when turning and does not permit the harrows to swing to the non-working position by backing the tractor.

It is an object of my invention to provide a multiple hitch for connecting a plurality of multiple-gang disc harrows which will prevent the harrows from interfering when turning and which will allow the tractor to be backed so as to swing the harrows to the non-working position.

Another object is to provide in a hitch of the above class a means for holding all of the harrows in the non-working position, so that upon a forward motion thereof no work will be done. This is particularly useful when moving the harrows from place to place over ground not to be worked.

It is also an object to provide a means for simultaneously releasing all of the harrows so that upon a forward motion of the tractor all of the harrows are automatically moved to the working position.

Another object is to provide a means for automatically locking all of the harrows in non-working position when the tractor is backed.

It is also an object to provide a novel means for adjusting the working angle of the harrows when in the working position.

Another object is to provide a means for controlling the position of the harrows which may be operated by a driver from his position on the tractor.

Further objects and advantages of my invention are manifest in the particular construction of the preferred form of my device, as will be apparent to those skilled in the art from the following description.

Fig. 1 is a plan view of a device of my invention showing the harrows in a non-working position.

Fig. 2 is a plan view taken of the same device as shown in Fig. 1, showing the harrows in a working position.

Fig. 3 is a side elevation, on a somewhat enlarged scale taken on the line 3—3 of Fig. 1.

Fig. 4 is a plan view on an enlarged scale of a catch means of my invention.

Fig. 5 is a section view taken on the line 5—5 of Fig. 4.

Referring particularly to Fig. 1 in the drawings, I show a plurality of harrows 11 which are connected by means of a hitch 12 of my invention to a draft yoke 13 which is adapted to be connected to a tractor or other draft device (not shown).

The harrows 11 which I have illustrated are shown and described in detail in my co-pending applications, supra, and reference should be had to these applications for a more detailed description. Each of the harrows 11 consists essentially of a front gang 16, a rear gang 17, and an inter-gang yoke 18 for connecting the front and rear gangs 16 and 17. The rear gang 17 includes a plurality of discs 20 mounted on a shaft 21, which is rotatably carried by bearings 22 on right-hand and left-hand side members 24 and 26 of a frame 27 composed of front members 30 and rear members 31 rigidly secured to the side members 24 and 26. Likewise, the front gang 16 includes a plurality of discs 34 mounted on a shaft 35 rotatably carried by bearings 37 on right-hand and left-hand side members 38 and 39 of a frame 40 having a front member 42 and a rear member 43 rigidly secured to the side members 38 and 39.

The interconnecting yoke 18 connects the frames 40 and 27 of the front and rear gangs 16 and 17 and is composed of two bars 46 held in spaced relationship one above the other and bent to form a long leg 47 and a short leg 48 connected by a curved portion 49. The ends of the legs 47 and 48 extend underneath the rear members 43 of the front gang frame 40 and, as shown in Fig. 3, are universally connected to brackets 52 on the side members 38 and 39 by horizontal and vertical bolts 54 and 55 and swivel links 56. The curved portions 49 of the bars 46 extend at either side of the front members 30 of the rear gang frame 27 and are pivotally connected thereto by a bolt 60. This permits the front and rear gangs 16 and 17 to pivot relative to each other about the bolt 60 and assume a parallel non-digging position, as shown in Fig. 1, or an angled digging position, as shown in Fig. 2. The draft yoke 13, to which the harrows 11 are connected by the hitch 12, is positioned in front of the harrows 11 and comprises a horizontal rectangular bar or evener 64, to which are bolted straight and angled draft bars 65 and 66. The draft bars 65 and 66 extend forward from the evener 64 and the front ends thereof are bolted to a draft plate 68 having an opening 69 for attachment to the draft bar of a tractor (not shown). Bolted to the draft bars 65 and 66 are braces 70 which serve to strengthen these members.

The multiple hitch 12 of my invention operatively connects the harrows 11 and the draft yoke 13 and comprises a plurality of stationary arms 74, which are bolted to the evener 64 and braced thereto by braces 75. Each of the arms 74 extends backward and is pivotally connected by a bolt 77 to a bracket 78 on the right-hand side member 38 of each of the front gang frames 40. The front members 42 are normally extended outside the right-hand side members 38 and carry yokes 80, which may be bolted thereto by bolts 81 and which yokes are spaced above said front members so as to provide horizontal slots through which the bars 74 extend, thus allowing a horizontal movement of the arms 74, but resisting a vertical movement thereof. The arms 74 are disposed along the length of the evener 64 so that when the harrows 11 are in the non-digging position, as shown in Fig. 1, the front gangs 16 of all of the harrows 11 are in alignment, as are also the rear gangs 17, and the harrows are spaced relative to each other so as to provide a clearance therebetween. The arms thus provide a means for pivotally connecting the harrows 11 to the evener 64 so that they are held in spaced relationship and cannot interfere with one another.

Pivotally secured by bolts 84 to brackets 85 of the left-hand side members 39 on the forward gang frames 40 are movable arms 86 which extend forward beneath yokes 88 secured to the front members 42 by bolts 89, in a manner similar to the arms 74. As best shown in Figs. 4 and 5, the arms 86 extend forward of the evener 64 and each is slidable beneath a pair of yokes 92 secured to the evener 64 by bolts 93. The extending end of each of the arms 86 is provided with a plurality of holes 94, in any one of which a stop 96 may be placed. As explained before, the right hand sides of the front gangs 16 are pivoted to the stationary arms 74 while the left-hand sides thereof are pivoted to the movable arms 86. This construction permits the front gangs 16 to pivot from the position shown in Fig. 1 to the position in which they are shown in Fig. 2, the arms 86 sliding rearwardly between the yokes 92 and the evener 64 until the stops 96 engage the evener 64. By placing the stops 96 in the different holes 94 the distance that the arms 86 move backwards can be varied and the working angle or the angle through which the front gangs 16 swing can thus be controlled.

Slidable between the yokes 92 is a latch bar 100 which carries a plurality of pins 101, one of which is adjacent each of the arms 86 and engages a projection 102 on each of the arms 86, as shown in Fig. 4, when the harrows 11 are in the non-working position. The projections 102 have inclined forward faces 104 and right-angled rear faces 105 so as to form with the pins 101 a plurality of catches 108 which permit the projections 102 to move past the pins 101 as the arms 86 are moved forward, but prevent a rearward movement thereof.

Secured to the arms 86 are stops 110 which engage the evener 64 and prevent a forward movement of the arms 86 in excess of that necessary to engage the catches 108. Secured to the evener 64 and engaging the end of the latch bar 100 is a tension spring 112 which normally holds the pins 101 in engagement with the sides of the arms 86. Pivotally connected between the latch bar 100 and the evener 64 is a bell crank 114 at the free end of which is a cord 115 which, when pulled forward, rotates the bell crank 114 and slides the latch bar 100 so as to disengage the catches 108.

As best shown in Fig. 3, pivotally secured by bolts 118 to brackets 119 on the left-hand side members 26 of the rear gang frames 27 are anchor bars 120 which are bent to clear the discs 34 and which extend forward to the evener 64 where they are swivelly connected to a bracket 121 by bolts 122 and 123 and intermediate swivel links 124 as shown in Fig. 5. The bars 120 form with the inter-gang yoke 18 a two-point swivel attachment for the rear gangs 17 and are made sufficiently long so that they will coact with the inter-gang yokes 18 to hold the rear gangs 17 in non-working position when the front gangs 16 are in the non-working position.

In the operation of my device the draw plate 68 is connected to a tractor which pulls the draft yoke 13, this pull or draft force being transmitted to the evener or cross member 64, from which it is in turn transmitted through the stationary arms 74 and movable arms 86 to the forward gangs of the harrows 11. When the catches 108 are engaged by the pins or latch dogs 101, the leftward sides of the front gangs 16 will be held forwardly in non-working position, as shown in Fig. 1. The pull is transmitted from the front gangs 16 through the inner-gang yokes 18 to the rear gangs 17 and from the evener 64 through the bars 120 to the rear gangs 17, thus holding the rear gangs 17 in non-working position. The harrows 11 are thus drawn by the tractor in a non-working position, as shown in Fig. 1.

When it is desired to have the harrows 11 work, the operator pulls the cord 115 and releases the catches 108 in a manner already explained. Upon a forward movement of the tractor, the pull is transmitted only to the right-hand ends of the front gang frames 40 and through the bars 120 to the left-hand end of the rear gang frames 27. This causes the front gangs 16 to swing to an angled working position, as shown in Fig. 2, the working angle or the angle through which they swing being determined by the position of the stops 96 in the holes 94.

When the front gangs 16 swing, the inter-gang yokes 18 are moved backwards relative to the draft yoke 13, which moves the points of connection of the inter-gang yokes 18 and the rear gang 17 backward. Since the position of the left-hand end of the rear gang frames 27 is fixed relative to the draft yoke 13 by the bars 120, the rear gangs are also swung to an angled working position, as shown in Fig. 2. The harrows 11 continue to work as long as the operator desires.

When it is desired to have the harrows 11 assume the non-working position, the tractor is backed which transmits a thrust through the draft yoke 13, through the arms 74 to the right-hand side of the front gangs 16 and through the bars 120 to the left-hand sides of the rear gangs 17. Since the arms 86 are free to move forward, the left-hand sides of the front gangs 16 and the right-hand sides of the rear gangs 17 swing forward, thus sliding the bars 86 forward relative to the evener 64 until the stops 110 engage the evener 64, at which time the catches 108 also are engaged. The tractor may now move the harrows 11 forward in a non-working position until the catches 108 are released by the operator.

It should be noted that the operator or driver may cause the harrows to work by pulling on the cord 115 and moving the tractor forward. He may also return the harrows 11 to the non-working position by simply backing up the tractor. In this manner full control of the harrows 11 may be obtained by the operator from his position on the tractor. The providing of an adjustable stop 96 for each of the harrows 11 also has advantages since it permits the working angle of one of the harrows 11 to be adjusted independently of the others, this being advantageous under certain conditions.

Although I have shown and illustrated a hitch 12, which is adapted to connect three harrows 11 to the draft yoke 13, it should be understood that I am not limited to the use of three harrows, as more or less may be used, as desired. Other modifications may be made without departing from the spirit of my invention.

I claim as my invention:

1. In combination: a plurality of multiple-gang, disc harrows adapted to swing to a working position upon a forward movement thereof and to swing to a non-working position upon a backward movement thereof; a draft means adapted to be tractively connected to a tractor; and a hitch means tractively connecting said draft means and said harrows and adapted to releasably hold said harrows in non-working position upon a forward movement of said tractor.

2. In combination: a plurality of multiple-gang, disc harrows adapted to swing to a working position upon a forward movement thereof and to swing to a non-working position upon a backward movement thereof; draft bars adapted to be tractively connected to a tractor; an evener secured to said draft bars; and a hitch means tractively connecting said evener and said harrows and adapted to releasably hold said harrows in non-working position upon a forward movement of said tractor.

3. In combination: a plurality of multiple-gang, disc harrows adapted to swing to a working position upon a forward movement thereof and to swing to a non-working position upon a backward movement thereof; draft bars adapted to be tractively connected to a tractor; an evener secured to said draft bars; an arm pivotally connecting said harrows and said evener; and catch means carried by said evener for releasably holding said harrows in non-working position upon a forward movement of said tractor.

4. In combination: a plurality of multiple-gang, disc harrows adapted to swing to a working position upon a forward movement thereof and to swing to a non-working position upon a backward movement thereof; draft bars adapted to be tractively connected to a tractor; an evener secured to said draft bars; an arm pivotally connecting said harrows and said evener; catches on said evener associated with each of said harrows and adapted to hold said harrows in non-working position upon a forward movement of said tractor; and release means adapted to release said catches.

5. In combination: a plurality of multiple-gang, disc harrows adapted to swing to a working position upon a forward movement thereof and to swing to a non-working position upon a backward movement thereof; draft bars adapted to be tractively connected to a tractor; an evener secured to said draft bars; an arm pivotally connecting said harrows and said evener; arms carried by each of said harrows; and catch means carried by said evener and adapted to releasably hold said harrows in non-working position upon a forward movement of said tractor.

6. In combination: a plurality of multiple-gang, disc harrows adapted to swing to a working position upon a forward movement thereof and to swing to a non-working position upon a backward movement thereof; draft bars adapted to be tractively connected to a tractor; an evener secured to said draft bars; an arm pivotally connecting said harrows and said evener; arms carried by each of said harrows; catches on said evener associated with each of said harrows and adapted to engage said arms and hold said harrows in non-working position upon a forward movement of said tractor; and release means adapted to release said catches.

7. In combination: a plurality of multiple-gang, disc harrows adapted to swing to a working position upon a forward movement thereof and to swing to a non-working position upon a backward movement thereof; draft bars adapted to be tractively connected to a tractor; an evener secured to said draft bars; an arm pivotally connecting said harrows and said evener; arms carried by each of said harrows; a bar slidably carried by said evener; catches on said bar for engaging said arms and holding said harrows in non-working position upon a forward movement of said tractor; and means adapting said bar for movement to disengage said catches from said bar.

8. In combination: a plurality of multiple-gang, disc harrows adapted to swing to an angled working position upon a forward movement thereof and to swing to a non-working position upon a backward movement thereof; draft bars adapted to be tractively connected to a tractor; an evener secured to said draft bars; a hitch means tractively connecting said evener and said harrows and adapted to releasably hold said harrows in non-working position upon a forward movement of said tractor; and means carried by said hitch means for varying the working angle of said harrows.

9. An implement of the character described, including: a plurality of harrow units each consisting of cooperating harrow structures adapted to swing between working and non-working positions relative to the line of travel of said implement; draft bars adapted to be connected to a tractor; an evener secured to said draft bars; means pivotally securing said harrow units to said evener; arms extending from each of said harrow units; catches on said evener adapted to engage said arms so as to hold said harrow units in relatively non-working positions during engagement of said catches with said arms; and release means adapted to release said catches so as to permit said harrow units to move toward relatively working positions.

10. In an implement of the class described, the combination of: a plurality of multiple-gang disc harrows adapted to swing to a working position upon movement in one direction and to swing to a non-working position upon movement in another direction; and connecting means associating said harrows and a draft device for moving said harrows and releasably holding said harrows in non-working position during their forward movement.

11. An implement of the class described adapted for attachment to a draft device, including: a plurality of harrow units in side-by-side position, said harrow units being adapted for movement, by engagement with the ground, to working position upon forward travel, and to non-working position upon rearward travel; a draft member so connecting said harrow units to said draft device that said units may swing between working and non-working positions; and connecting means so connecting said draft member to said harrow units as to restrain the movement of said units to working position during their forward travel, said connecting means being adapted for actuation by the operator of said draft device for simultaneously releasing said harrow units for movement to working position.

12. An implement of the class described adapted for attachment to a draft device, including: a plurality of harrow units in side-by-side position, said harrow units being adapted for movement, by engagement with the ground, to working position upon forward travel, and to non-working position upon rearward travel; a draft member so connecting said harrow units to said draft device that said units may swing between working and non-working positions; a connecting member connected to each harrow unit and extending adjacent said draft member; an engaging member associated with said draft member and adapted for engagement with said connecting members to restrain the movement of said harrow units to working position during forward travel, said engaging member being movable to non-engaging position; and means operable by the operator of the tractive device and from his station thereon for moving said engaging member to non-engaging position.

13. An implement of the class described adapted for attachment to a draft device, including: a plurality of harrow units in side-by-side position, said harrow units being adapted for movement, by engagement with the ground, to working position upon forward travel, and to non-working position upon rearward travel; a draft member so connecting said harrow units to said draft device that said units may swing between working and non-working positions; a connecting member connected to each harrow unit and extending adjacent said draft member, said connecting members having stops thereon adapted for limiting the movement of said harrow units by engagement with said draft member; an engaging member associated with said draft member and adapted for engagement with said connecting members to restrain the movement of said harrow units to working position during forward travel, said engaging member being laterally movable to non-engaging position; and means operable by the operator of the tractive device and from his station thereon for moving said engaging member to non-engaging position.

14. An implement of the class described adapted for attachment to a draft device, including: a plurality of harrow units in side-by-side position, said harrow units being adapted for movement, by engagement with the ground, to working position upon forward travel, and to non-working position upon rearward travel; a draft member so connecting said harrow units to said draft device that said units may swing between working and non-working positions; connecting means attached to said harrow units; engaging means releasably engaging said connecting means for restraining the movement of said harrow units to working position during forward travel; resilient means associated with said engaging means and resiliently urging said engaging means into engagement with said connecting means; and release means operable from said draft device for moving said engaging member to non-engaging position.

15. An implement of the class described adapted for attachment to a tractive vehicle, including: a draft member connected to said tractive vehicle; a plurality of harrow units disposed in a front row and a rear row, the units of said front row being so connected to said draft member as to move to working position during forward travel and to non-working position during rearward travel, and the units of said rear row being so connected to said units of said front row and said draft member that the direction and extent of their movement between working and non-working positions is controlled by the position of said units in said front row; an arm attached to each harrow unit of said front row; an engaging member adapted for releasably engaging said arms to retain said harrow units in non-working position during forward travel; and releasing means operable from said tractive vehicle for releasing said engaging member from said arms so that said units of both rows are moved to working position during forward travel.

In testimony whereof, I have hereunto set my hand at Oxnard, California, this 23d day of Sept., 1929.

SAMUEL S. FURRER.